US010075557B2

(12) United States Patent
Smith, II et al.

(10) Patent No.: US 10,075,557 B2
(45) Date of Patent: Sep. 11, 2018

(54) SERVICE AUTHORIZATION HANDSHAKE

(71) Applicant: Amazon Technologies, Inc., Seattle, WA (US)

(72) Inventors: Edward Bradford Smith, II, Seattle, WA (US); Graeme David Baer, Bellevue, WA (US); Manivannan Sundaram, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 14/984,957

(22) Filed: Dec. 30, 2015

(65) Prior Publication Data
US 2017/0195457 A1 Jul. 6, 2017

(51) Int. Cl.
*H04L 29/08* (2006.01)
*H04L 29/06* (2006.01)
(52) U.S. Cl.
CPC ............ *H04L 67/327* (2013.01); *H04L 63/06* (2013.01); *H04L 63/10* (2013.01); *H04L 63/166* (2013.01)
(58) Field of Classification Search
CPC ... H04L 63/101; H04L 63/08; G06F 21/6272; G06F 17/30097; G06F 21/10; G06F 21/60; G06F 21/62; G06F 21/6209; G06F 21/64; G06F 21/645; G06F 21/31; G06F 21/00; G06F 21/34; G06F 21/35; G06Q 20/206;
(Continued)

(56) References Cited

U.S. PATENT DOCUMENTS 8,244,277 B1 * 8/2012 Cha .................. H04M 1/72566
455/414.1
8,315,198 B2 * 11/2012 Corneille ................. G06F 8/61
340/7.2

(Continued)

FOREIGN PATENT DOCUMENTS

WO 2005043807 A1 5/2005

OTHER PUBLICATIONS

International Search Report and Written Opinion dated Mar. 10, 2107, International Patent Application No. PCT/US2016/068073, filed Dec. 21, 2016.

(Continued)

*Primary Examiner* — Ninos Donabed
(74) *Attorney, Agent, or Firm* — Davis Wright Tremaine LLP

(57) ABSTRACT

The present document describes systems and methods that authorize client resources such as computers, servers, computing appliances, and virtual machines to access online services provided by an online service provider. To authorize a client resource, a client submits a registration request on behalf of the client resource to an authorization service provided by the service provider. The authorization service returns an activation code to the client. The activation code may expire after an amount of time, or upon first use. The client provides the activation code to an agent running on the client resource. The agent establishes communication with the authorization service, and upon providing the activation code to the authorization service, receives an authorization token that can be used by the client resource to access online services in accordance with security roles or permissions specified with the registration request.

19 Claims, 12 Drawing Sheets

(58) Field of Classification Search
CPC ......... Y10S 707/959; Y10S 707/99932; Y10S 707/99953
See application file for complete search history.

(56) References Cited

U.S. PATENT DOCUMENTS

| | | | | |
|---|---|---|---|---|
| 8,464,312 | B1* | 6/2013 | Schneider | H04L 63/0218 726/1 |
| 8,577,334 | B1* | 11/2013 | Smith | H04W 12/08 455/410 |
| 2005/0071780 | A1* | 3/2005 | Muller | G06F 9/4443 715/825 |
| 2005/0085272 | A1* | 4/2005 | Anderson | H04M 1/72525 455/566 |
| 2008/0301691 | A1* | 12/2008 | Mamagkakis | G06F 8/00 718/104 |
| 2009/0089866 | A1* | 4/2009 | Yato | G06F 21/6218 726/6 |
| 2010/0202331 | A1* | 8/2010 | Zhang | H04W 52/286 370/310 |

OTHER PUBLICATIONS

Atkinson, R., "Security Architecture for the Internet Protocol," Request for Comments: 1825, Standards Track, Aug. 1995, 23 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Dierks, T., et al., "The TLS Protocol Version 1.0," Request for Comments: 2246, Standards Track, Jan. 1999, 75 pages.
Kent, S., "Security Architecture for the Internet Protocol," Request for Comments: 2401, Standards Track, Nov. 1998, 62 pages.
Orman, H., "The OAKLEY Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.

Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, E., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.

(56) References Cited

OTHER PUBLICATIONS

Mavrogiannopoulos, N., and D. Gillmor, "Using OpenPGP Keys for Transport Layer Security (TLS) Authentication," Request for Comments: 6091, Informational, Feb. 2011, 9 pages.

Turner, S., and T. Polk, "Prohibiting Secure Sockets Layer (SSL) Version 2.0," Request for Comments: 6176, Standards Track, Mar. 2011, 4 pages.

Kim, W., et al., "Addition of the ARIA Cipher Suites to Transport Layer Security (TLS)," Request for Comments: 6209, Informational, Apr. 2011, 10 pages.

Rescorla, E., and N. Modadugu, "Datagram Transport Layer Security Version 1.2," Request for Comments: 6347, Standards Track, Jan. 2012, 33 pages.

Kanno, S., and M. Kanda, "Addition of the Camellia Cipher Suites to Transport Layer Security (TLS)," Request for Comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

McGrew, D., and D. Bailey, "AES-CCM Cipher Suites for Transport Layer Security (TLS)," Request for Comments: 6655, Standards Track, Jul. 2012, 8 pages.

Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

\* cited by examiner

SERVICE AUTHORIZATION HANDSHAKE

BACKGROUND

Online services are an important part of modern computing. Online services provide storage and backup services, data processing services, key management services, virtual computing services, financial services, shopping services, and many other computing and data access services. Access to online services is generally controlled by a variety of authentication and authorization techniques such as username/password pairs, digital certificates, network address filters, and biometric identification. When accessing an online service, a client provides the appropriate authentication information to the online service, and the online service grants access. In some environments, clients operate a variety of client resources such as client computers, servers, virtual machines, and other network-connected computing appliances that would benefit from access to online services. However, providing client resources access to online services can be a difficult problem.

Client resources may require different levels of access to online services than would be provided by simply providing the client credentials to the client resource. In addition, if a client resource requires access to multiple online services, multiple sets of client credentials may be necessary. If a particular client credentials are changed, client resources that use the particular credentials will need to be updated with the new credentials. For these and other reasons, controlling the authorization of client resources to use online services can be very troublesome.

BRIEF DESCRIPTION OF THE DRAWINGS

Various techniques will be described with reference to the drawings, in which.

DETAILED DESCRIPTION

Figure 1:
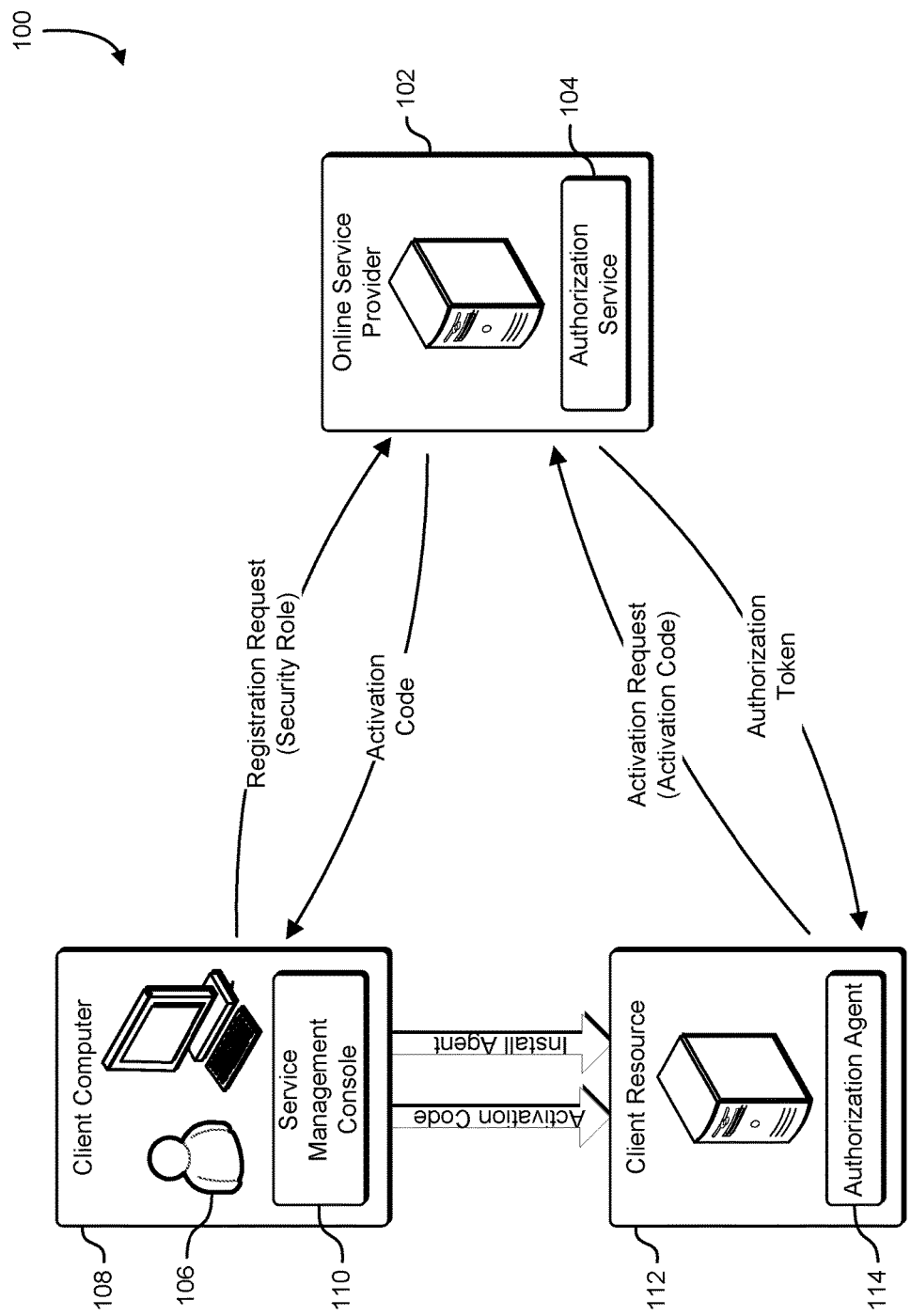
FIG. 1 shows an illustrative example of an environment in which various embodiments may be practiced.

The current document describes an authorization service that allows on-premises client resources such as servers, computing appliances, and virtual machines to register with an online service provider, and receive an authorization token that can be used to access online services provided by the online service provider. This can allow, for example, the on-premises client resources to communicate with, including receiving commands from, the online service provider. A client such as an administrator or other authorized user accesses the authorization service using a client computer system via an application programming interface ("API"), command line interface, or other user interface. The client registers a client resource with the authorization service by providing a resource identifier ("Resource ID"), and a security role or a set of privileges to be granted to the client resource. The authorization service records the resource ID and the granted role or privileges in a resource registration database, and generates a one-time-use activation code which is returned to the client. The one-time-use activation code expires after an amount of time.

The client authorizes the client resource by installing an authorization agent on the client resource, and activating the authorization agent with the authorization service. The client is provided with installation instructions for the authorization agent along with the one-time-use activation code. In some environments, the client is prompted to download and execute an installation program on the client resource. The installation program may take the form of an MSI, PKG, ZIP, or setup.exe file.

Once the authorization agent is installed the client activates the authorization agent by submitting an activation command to the authorization agent. In some implementations, the activation command is submitted as a parameter to the installation program. The client provides the resource ID and the activation code as parameters with the activation command. As a result of receiving the activation command, the authorization agent generates and retains a public-private key pair for signing requests sent to the authorization service. The authorization agent generates an activation request that includes the resource ID, the activation code, and the public key of the public-private key pair. In some implementations, the activation request includes a pseudo-unique resource ID. The pseudo-unique resource ID is generated by the client resource to have a value that tends to be unique for each instance of a client resource, even when the client resource is imaged or cloned from another client resource. For example, the pseudo-unique resource ID can be based at least in part on a processor ID, hardware serial number, or network address associated with the client resource. The pseudo-unique resource ID may be used to detect client resources that are cloned or replicated. The authorization agent signs the activation request with the private key of the public-private key pair and submits the activation request to the authorization service.

The authorization service receives the activation request from the authorization agent, and verifies the signature on the activation request using the included public key. The activation request is validated by confirming that the activation code is valid for the provided resource ID, is not expired, or already in use. If the activation request is valid, the authorization service records that the activation code is no longer valid in a database maintained by the activation service and records the client resource information in a database of authorized client resources. The activation code may be invalidated by the authorization service itself, or by causing another entity to invalidate the activation code. The authorization service retrieves the requested roll or privileges from the resource registration database based at least in part on the resource ID provided with the activation command. The activation service contacts the online service provider, and acquires an authorization token that provides the requested role or privileges. The authorization service returns the authorization token to the authorization agent running on the client resource. A resource authorization database retains information relating to issued authorization tokens for later use.

The authorization agent uses the authorization token to access online services provided by the online service provider. When the client resource sends a request to an online service, the client resource provides the authorization token with the request. The online service receives the request, and fulfills or denies the request in accordance with the role or privileges associated with the authorization token. If the authorization token expires, the authorization token may be refreshed by the authorization agent. To refresh an authorization token, the authorization agent sends a signed request to the authorization service. The authorization service validates the digital signature on the request, acquires a new authorization token from the online service provider, and returns the new authorization token to the authorization agent.

In some environments client resources may be cloned or replicated. Cloned resources may be detected by the authorization service during activation, or during requests for service. In some implementations, the authorization agent generates a pseudo-unique resource identifier that is provided to the authorization service during registration of the client resource. The pseudo-unique resource identifier is provided to the authorization service during registration and distinguishes a cloned client resource from a related parent client resource. In another implementation, the authorization agent includes a sequence number with each request to the authorization service. If the authorization service receives a request from a client resource that includes a previously received resource ID and sequence number, a cloned resource is detected.

Various authentication mechanisms used by a client may be used to acquire authorization tokens for client resources. For example, if a client uses a username and a password to authenticate with an online service. The username and password can be supplied by the client during the registration of a client resource with the authorization service. If the client uses a digital certificate to authenticate with the online service, the digital certificate can be supplied by the client during the registration of the client resource with the authorization service.

Client resources may be located on a local client computer system, a client-controlled network environment, on-premises data center, remote network, or network controlled by the online service provider. On-premises client resources refer to client resources that are physically located at the client's place of business, and are subject to the physical control of the client. The authorization service may be a separate service offered by the online service provider, or maybe a service associated with a particular online service offered by the online service provider. In some implementations, the authorization service is offered by a third-party, and the authorization service coordinates with the online service provider or the particular online services for which the authorization service provides authorization tokens. By distributing authorization tokens to client resources, client resources are able to access a number of online services under the authority of the client that owns the client resources without distributing client credentials to the client resources or issuing new credentials for each client resource.

FIG. 1 shows an illustrative example of an environment in which various embodiments may be practiced. An online service provider 102 provides a number of online services as well as an authorization service 104. A client 106 of the online service provider 102 accesses the services provided by the online service provider via a computer network. The client 106 manages access to the online service provider from a client computer system 108 that provides a service management console 110. The client 106 owns and operates a number of client resources such as servers, virtual machines, and other computing appliances on the network.

If the client 106 wants to provide access to the services provided by the online service provider to a client resource 112, the client generates a registration request using the service management console 110 and sends the registration request to the authorization service 104. The registration request includes a resource ID for the client resource 112, a security role for to be granted to the client resource, and any credentials associated with the client 106 that are necessary to authorize the request such as a username/password combination or a client digital certificate.

The authorization service 104 generates an activation code, and stores the activation code, resource ID, and a timestamp in a resource registration database located within the authorization service 104. Storing the activation code in the resource registration database may include storing a record with the activation code itself or information that enables verification of access to the activation code, such as a hash or other information derived based at least in part on the activation code. The resource ID may be stored as a hash that allows verification of a matching resource ID presented by the authorization agent. The activation code is returned to the client by the service management console 110, and the client 106 is provided with instructions for downloading and installing an authorization agent 114 onto the client resource 112. In some embodiments, the authorization service causes the authorization agent 114 to be installed on the client resource 112 without intervention from the client 106. The authorization service 104 commands the service management console 110 to contact the client resource 112 and install the authorization agent 114. In another embodiment, the client 106 received instructions from the authorization service 104, and downloads an installation program for the authorization agent that is compatible with the client resource 112. The installation program can be transferred to the client resource 112 over the computer network or by using computer readable media such as a CD-ROM, USB memory stick, flash drive, or other media. The client 106 executes the installation program on the client resource 112 to install the authorization agent 114. Parameters may be provided to the installation program that specify the activation code and the resource ID. In some implementations, the client 106 issues an activation command to the authorization agent that includes the resource ID and the activation code as parameters.

The authorization agent 114 activates by sending an activation request that includes the activation code to the authorization service 104. In some implementations, the authorization agent 114 generates a public-private key pair such as a 2048 bit RSA key pair for use in signing requests sent to the authorization service 104. The authorization agent 114 may also generate a pseudo-unique resource ID that is supplied with the resource ID to the authorization service 104. The pseudo-unique resource ID helps to ensure that client resources that are generated by cloning or replicating other client resources have unique identifiers with the authorization service 104. The authorization agent 114 generates an activation request that includes the resource ID, the activation code, and optional pseudo-unique resource ID, and the public key of the public-private key pair. The activation request is signed using the private key of the public-private key pair and sent to the authorization service 104.

The authorization service 104 receives the activation request and verifies the signature on the request using the public key provided with the request. If the activation request is not properly signed, the request is denied. If the activation request is properly signed, the authorization service 104 accesses the resource registration database and extracts the activation code associated with the provided resource ID. If the activation code is not found, or if the activation code is expired, or if the activation code is not associated with the provided resource ID, or if the activation code has already been used, the activation code is invalid and the activation request is denied. If the activation code is valid, the activation code is removed from the resource registration database so that the activation code can no longer be used, and the roles and/or privileges assigned to the client resource 112 are retrieved from the registration database. The authorization service 104 requests an authorization token from the online service provider 102 that provides the roles and/or privileges assigned to the client resource 112. The authorization token, the resource ID, the pseudo-unique resource ID, the public key of the public-private key pair, and a current timestamp are retained in a resource authorization database within the authorization service 104. The authorization service 104 returns the authorization token to the authorization agent 114.

The authorization agent 114 receives the authorization token which can be used to access online services provided by the online service provider 102. In some implementations, the authorization agent 114 provides service API to applications running on the client resource 112. Service requests received by the service API are passed on to a service provided by the online service provider 102 along with the authorization token. The online service uses the authorization token to identify the requester, and to identify the role or permissions granted to the requester. If the role or permissions granted to the requester allow the service request to be fulfilled, the service fulfills the request and provides a response to the authorization agent 114. In another implementation, the authorization agent 114 provides the authorization token to applications running on the client resource 112, and the applications submit requests to a service provided by the online service provider 102 by providing the authorization token with the service requests. The service uses the authorization token to identify and authorize the requester, fulfills the service requests as appropriate, and provides associated responses for the service requests to the application.

In various implementations, the authorization token may be configured to expire after an amount of time. For example, the authorization token may expire one hour after the authorization token has been issued to the authorization agent 114. The authorization service 104 may issue an updated token to the authorization agent 114 in anticipation of expiration of the authorization token, as a result of receiving a refresh command from the authorization agent 114, or as a result of receiving a request from the authorization agent 114 (or application running on the client resource) with an expired authorization token.

Figure 2:
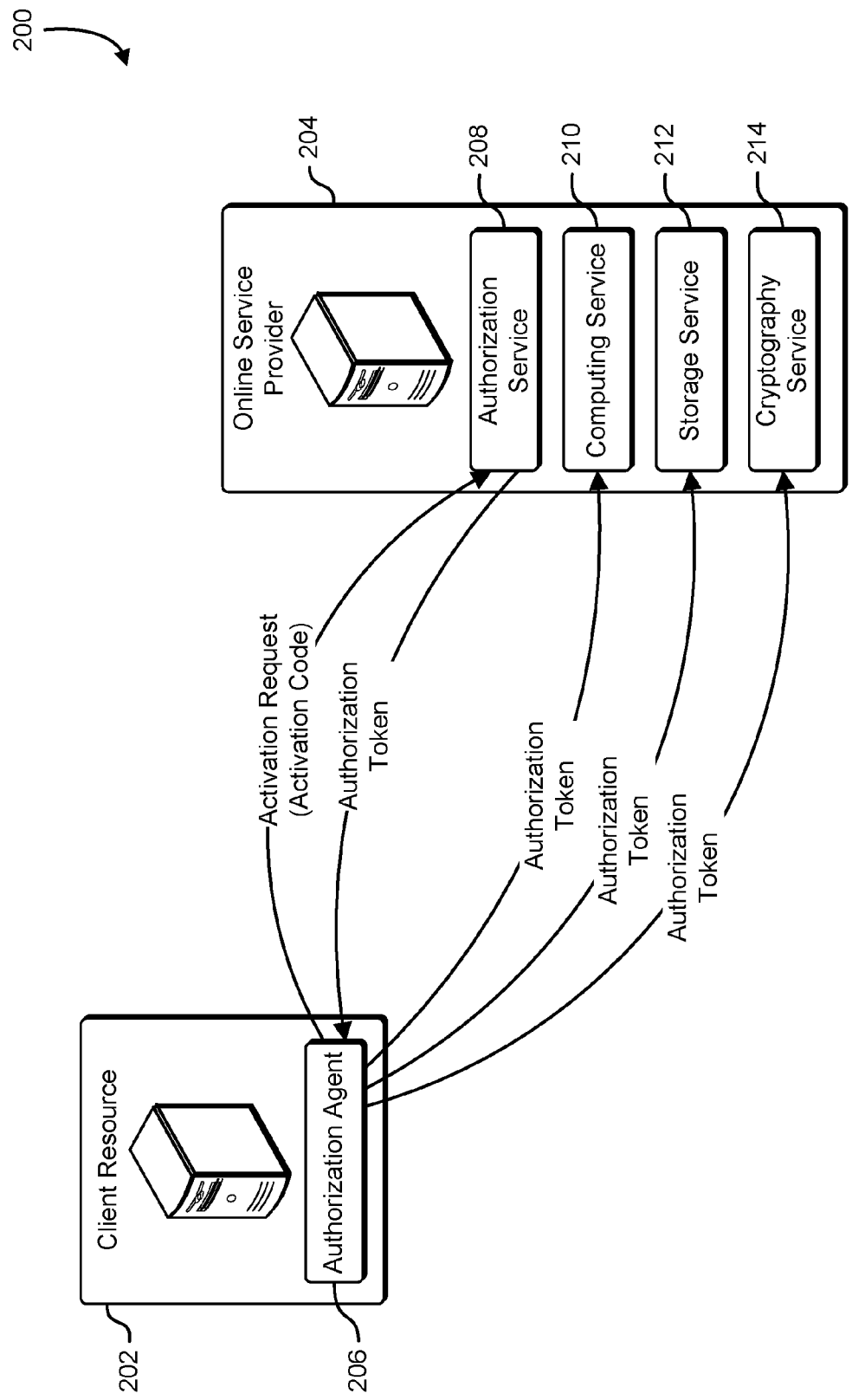
FIG. 2 shows an illustrative example of a client resource accessing a number of online services with a common authorization token, in accordance with an embodiment.

FIG. 2 shows an illustrative example of a client resource accessing a number of online services with a common authorization token, in accordance with an embodiment. An environment 200 includes a client resource 202 that accesses a number of online services provided by an online service provider 204. The client resource 202 has an authorization agent 206 installed that, in response to an activation request that includes an activation code, receives an authorization token from an authorization service 208. The authorization service 208 is associated with the online service provider 204. The online service provider 204 provides a number of online services including a computing service 210, a storage service 212, and a cryptography service 214. In additional implementations, the online service provider 204 may provide other online services such as key management services, virtual computing services, email services, messaging services, videoconferencing services, or Web search services. The authorization token provided by the authorization service 208 is associated with one or more roles and/or one or more permissions that grant access to one or more of the online services provided by the online service provider 204. Based at least in part on the roles and permissions associated with the authorization token, the authorization token may be used by the authorization agent 206 to access one or more of the services provided by the online service provider 204.

For example, if a client registers the client resource 202 with the authorization service 208 and specifies that the client resource 202 be granted a role that is permitted to access a number of services provided by the online service provider 204, the authorization token provided by the authorization service 208 to the authorization agent 206 on the client resource 202 may be used by the client resource 202 to access any service on the online service provider 204. For example, in FIG. 2, the authorization token provided by the authorization service 208 may be used by the authorization agent 206 to access the computing service 210, the storage service 212 or the cryptography service 214. The client, when authorizing the client resource, may request access to one, all, or a subset of the services provided by the online service provider. In another example, the authorization agent 206 receives a restricted token from the authorization service 208. The restricted token may be used by the authorization agent 206 to access the computing service 210 and the storage service 212, but not the cryptography service 214.

In some implementations, the client resource 202 receives commands from a service provided by the online service provider 204. For example, the token provided by the authorization agent 206 may allow access to a run-command service. The run-command service sends commands to the client resource 202 to execute. In another example, a security service provided by the online service provider 204 may determine that the client resource 202 has been compromised and send a command by the authorization agent 206 that causes a client resource 202 to delete sensitive data stored on the client resource 202.

Figure 3:
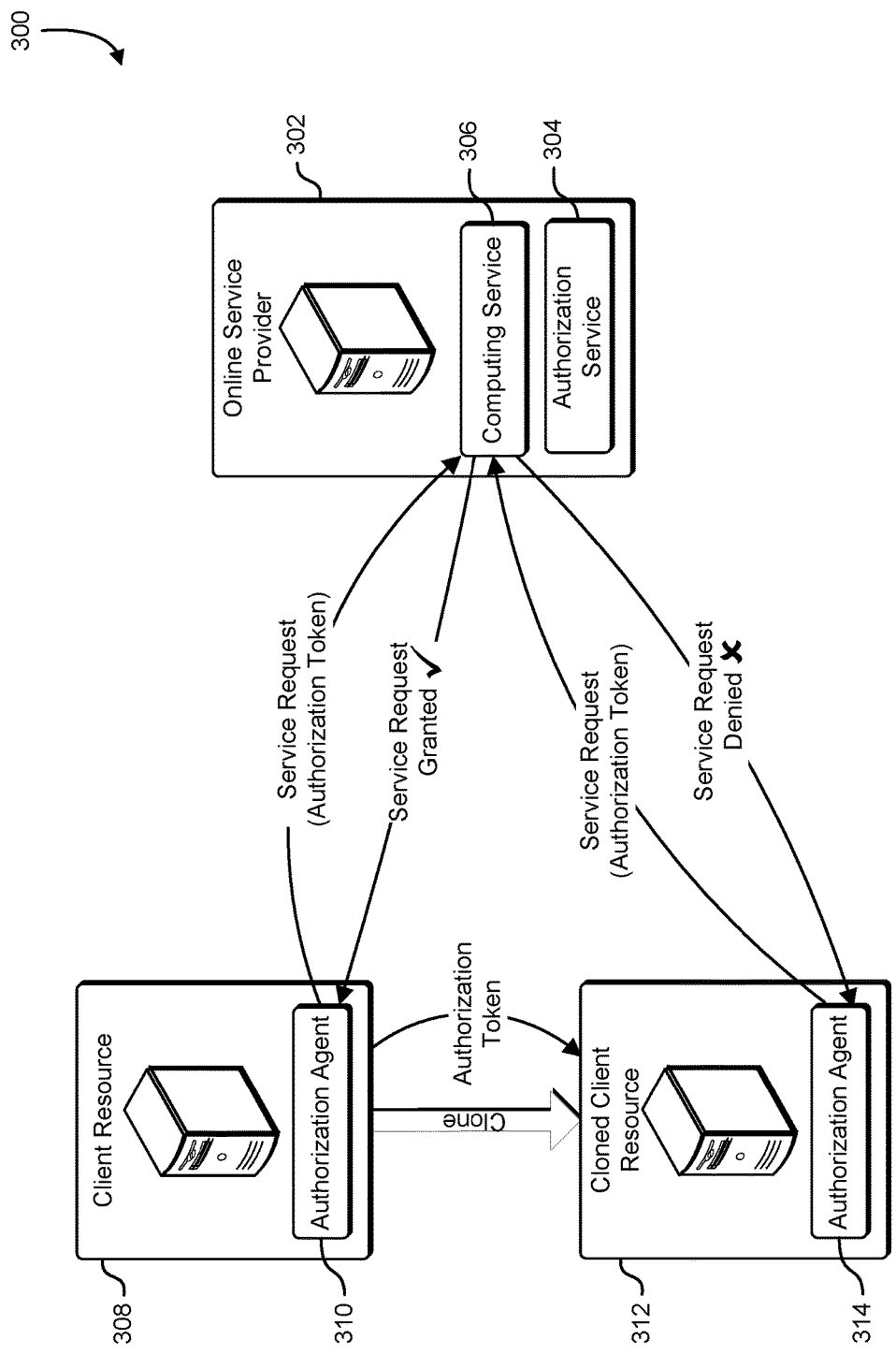
FIG. 3 shows an illustrative example of a cloned client resource accessing an online service, in accordance with an embodiment.

FIG. 3 shows an illustrative example of a cloned client resource accessing an online service, in accordance with an embodiment. A system 300 includes an online service provider 302 that provides an authorization service 304 and a computing service 306. In additional embodiments, the online service provider 302 may provide web hosting services, storage services, or other services in place of the computing service 306. A client resource 308 such as a virtual computer instance, web appliance, or other computing device hosts an authorization agent 310. The authorization agent 310 is registered with the authorization service 304, and has been provided with an authorization token by the authorization service 304. The client resource 308 generates and sends requests to the computing service 306 using the authorization token. Based at least in part on the authorization token, the computing service 306 determines whether the request is authorized and fulfills the request.

If the client resource 308 is cloned, copied, or otherwise replicated, a cloned client resource 312 is created. The cloned client resource 312 includes a duplicate authorization agent 314. In some implementations, the cloned client resource 312 and the duplicate authorization agent 314 have a configuration that matches the configuration of the client resource 308 and the authorization agent 310. If the duplicate authorization agent 314 generates and submits a service request to the computing service 306 that includes an authorization token that matches the authorization token used by the authorization agent 310, the computing service 306 detects that matching authorization tokens are being used by two different client resources and denies the service request submitted by the cloned client resource.

In some embodiments, the computing service 306 detects that matching authorization tokens are being used by using a pseudo-unique resource identifier provided by the client resources. The authorization agents generate pseudo-unique resource identifiers that are based at least in part on a processor ID, the network address of network interfaces associated with the client resources, or a machine serial number. The authorization agents provide the pseudo-unique resource identifier when submitting requests to the computing service 306. In another embodiment, the computing service 306 detects that matching authorization tokens are being used by examining sequence numbers included with requests sent by the authorization agents. Requests generated by an authorization agent are assigned a sequence number by the authorization agent. The sequence number is incremented for each successive request, and the computing service 306 compares the sequence number of each request received from a given authorization agent to the sequence number of the previous request received from the given authorization agent. If the computing service 306 receives a request from a duplicate authorization agent with a resource ID and a sequence number that match another request sent by the client resource 308, the computing service 306 will determine that the request originated from the cloned client resource 312 from a cloned resource. The computing service 306 notifies the authorization service 304, and the authorization service 304 reissues a new authorization token to the cloned client resource 312. In some implementations, when the computing service determines that the request originated from the cloned client resource 312, the service request is denied and a new token is not issued to the cloned client resource.

In another embodiment, the duplicate authorization agent 314 detects that the cloned client resource 312 is a cloned resource by comparing the pseudo-unique resource identifier to a newly generated pseudo-unique resource identifier. Prior to sending a request to the computing service 306, the duplicate authorization agent 314 generates a new pseudo-unique resource identifier and compares the new pseudo-unique resource identifier to the stored pseudo-unique resource identifier copied from the client resource 308 when the client resource 308 was cloned to produce the cloned client resource 312. If the stored pseudo-unique resource identifier does not match the new pseudo-unique resource identifier, the service request submitted by the cloned client request is denied. In some implementations, if the stored pseudo-unique resource identifier does not match the new pseudo-unique resource identifier, the duplicate authorization agent 314 contacts the authorization service 304 and requests a new authorization token. The new authorization token is used by the duplicate authorization agent 314 to request services from the computing service 306.

Figure 4:
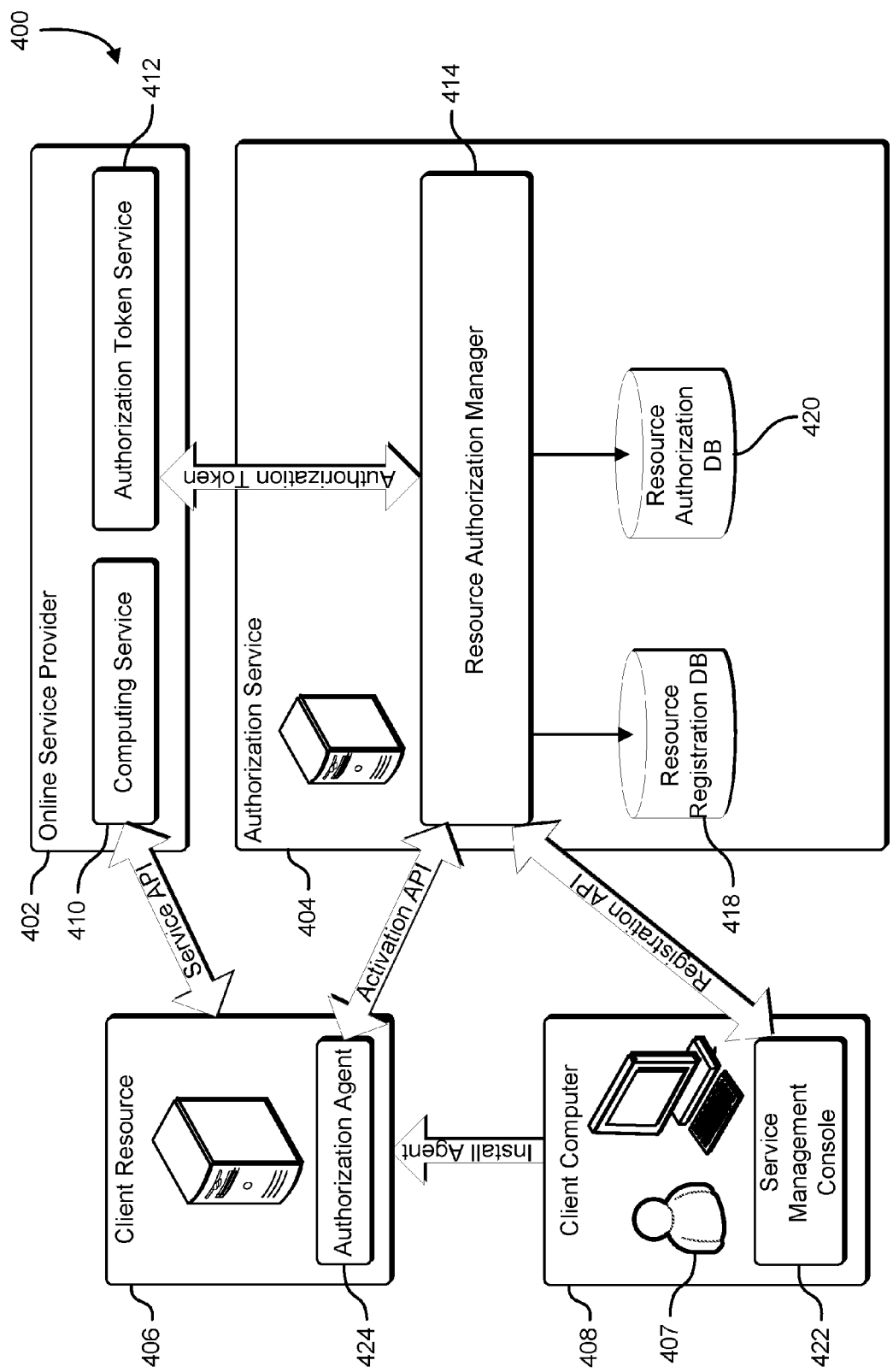
FIG. 4 shows an illustrative example of an authorization service that authorizes access to an online service by a client resource, in accordance with an embodiment.

FIG. 4 shows an illustrative example of an authorization service that authorizes access to an online service by a client resource, in accordance with an embodiment. A system diagram 400 includes an online service provider 402 that is associated with an authorization service 404. A client resource 406 is registered with the authorization service 404 by a client 407 operating a client computer 408. In the example shown in FIG. 4, the online service provider 402 includes a computing service 410, but the computing service 410 can optionally be replaced by a virtual computing service, a storage service, a cryptography service, or other online service. The online service provider 402 provides an authorization token service 412. The authorization token service issues tokens to the authorization service 404 which may be used by online entities to authorize service requests submitted to the computing service 410.

The authorization service 404 includes a resource authorization manager 414. The resource authorization manager 414 is an operational module that exposes an activation API and a registration API over the network. The registration API provides functions that allow the client 407 to register client resources that are authorized to access the online service provider 402. The activation API provides functions that allow an authorization agent to receive an authorization token in exchange for an activation code provided by the client 407. The authorization service 404 includes a resource registration database 418 that retains registration information for client resources. The registration information may include a resource ID, an activation code, a security role, security permissions, a registration timestamp, and a resource name. The authorization service 404 includes a resource authorization database 420. The resource authorization database 420 retains information relating to activated client resources such as the client resource 406. The information relating to activated client resources may include a resource ID, a pseudo-unique resource ID, a public encryption key, security roles, security permissions, and a token expiration.

The client resource 406 is authorized to access the computing service 410 using a process initiated by the client 407. The client 407 uses a service management console 422 hosted by the client computer 408. The service management console 422 provides command line interface, application programming interface, graphical user interface, or other interface to the resource authorization manager 414. The client 407 submits a client-resource registration request to the resource authorization manager 414 to register the client resource 406. The client-resource registration request specifies one or more security roles and/or one or more permissions to be granted to the client resource 406. The client-resource registration request is authorized by the client 407 using credentials of the client 407. For example, the client 407 may authorize the client-resource registration request using the client's username and password, digital certificate, or biometric signature. The resource authorization manager 414 verifies the credentials provided by the client 407, and if the credentials are sufficient, generates an activation code. In some implementations, the activation code expires after an amount of time. The amount of time is determined as an amount of time adequate to complete the activation of the client resource 406, such as an hour. The activation code and the expiration are stored in the resource registration database 418. The resource authorization manager 414 returns the activation code to the client 407 by the service management console 422.

The resource authorization manager 414 causes an authorization agent 424 to be installed on the client resource 406. In some implementations, the resource authorization manager 414 provides the client 407 with instructions on how to download and install the authorization agent 424 onto the client resource 406. In another implementation, the resource authorization manager 414 sends commands to the service management console 422 to cause the service management console 422 to install the authorization agent 424 on the client resource 406. In yet another implementation, the resource authorization manager 414 sends commands to the client resource 406 that cause the client resource 4062 install the authorization agent 424. The authorization agent 424 may be installed by copying executable images onto the client resource 406, or by running an installation program or installation script for the authorization agent 424 on the client resource 406. In some implementations, the client 407 provides the resource identifier and the activation code as parameters to the installation program or script that installs the authorization agent 424. In another implementation, the client 407 sends the resource ID and the activation code to the authorization agent 424 as part of an activation command.

The authorization agent 424 operates as a service on the client resource 406, and activates with the resource authorization manager 414 to acquire an authorization token that allows access to the computing service 410. The authorization agent 424 generates a public-private key pair, and retains the public-private key pair on the client resource 406. In some implementations, the authorization agent 424 generates a pseudo-unique resource ID that may be used to detect whether client resources are cloned or replicated. The authorization agent 424 sends an activation request to the authorization service that includes the resource ID for the client resource, the pseudo-unique resource ID generated by the authorization agent 424, the public key of the public-private key pair, and a timestamp. The activation request is signed using the private key of the public-private key pair, and sent to the authorization service 404. The authorization service 404 accesses the resource registration database 418 and determines whether the activation code is valid for the provided resource ID, and whether the activation code has expired or been previously used. If the activation code is not been previously used, is not expired, and is valid for the provided resource ID, the resource authorization manager 414 accepts the activation of the authorization agent 424 and records the resource ID, the pseudo-unique resource ID, the roles and permissions granted to the client resource 406, and the public key of the public-private key pair in the resource authorization database 420. The resource authorization manager 414 requests an authorization from the authorization token service 412 that grants the roles and permissions requested during the registration of the client resource 406, and returns the authorization token to the authorization agent 424.

The client resource 406 may use the authorization token to authorize requests sent to the computing service 410. In some implementations, the authorization token expires after an amount of time, such as an hour. If the authorization token expires, the authorization agent 424 may request a refreshed token from the resource authorization manager 414. Requests from the authorization agent 424 are signed with the private key of the public-private key pair, and the resource authorization manager 414 verifies the source of the requests by confirming the signature on the request with public keys stored in the resource authorization database 420. The client 407 is able to manage roles and permissions granted to client resources via the service management console 422. For example, if a particular client resource is compromised or decommissioned, the client 407 can access the resource authorization manager 414 via the service management console 422 and unregister the compromised client resource. The resource authorization manager 414 will contact the authorization token service 412 and invalidate the tokens held by the compromised resource. As a result, the compromised resource will no longer be able to access the computing service 410.

Figure 5:
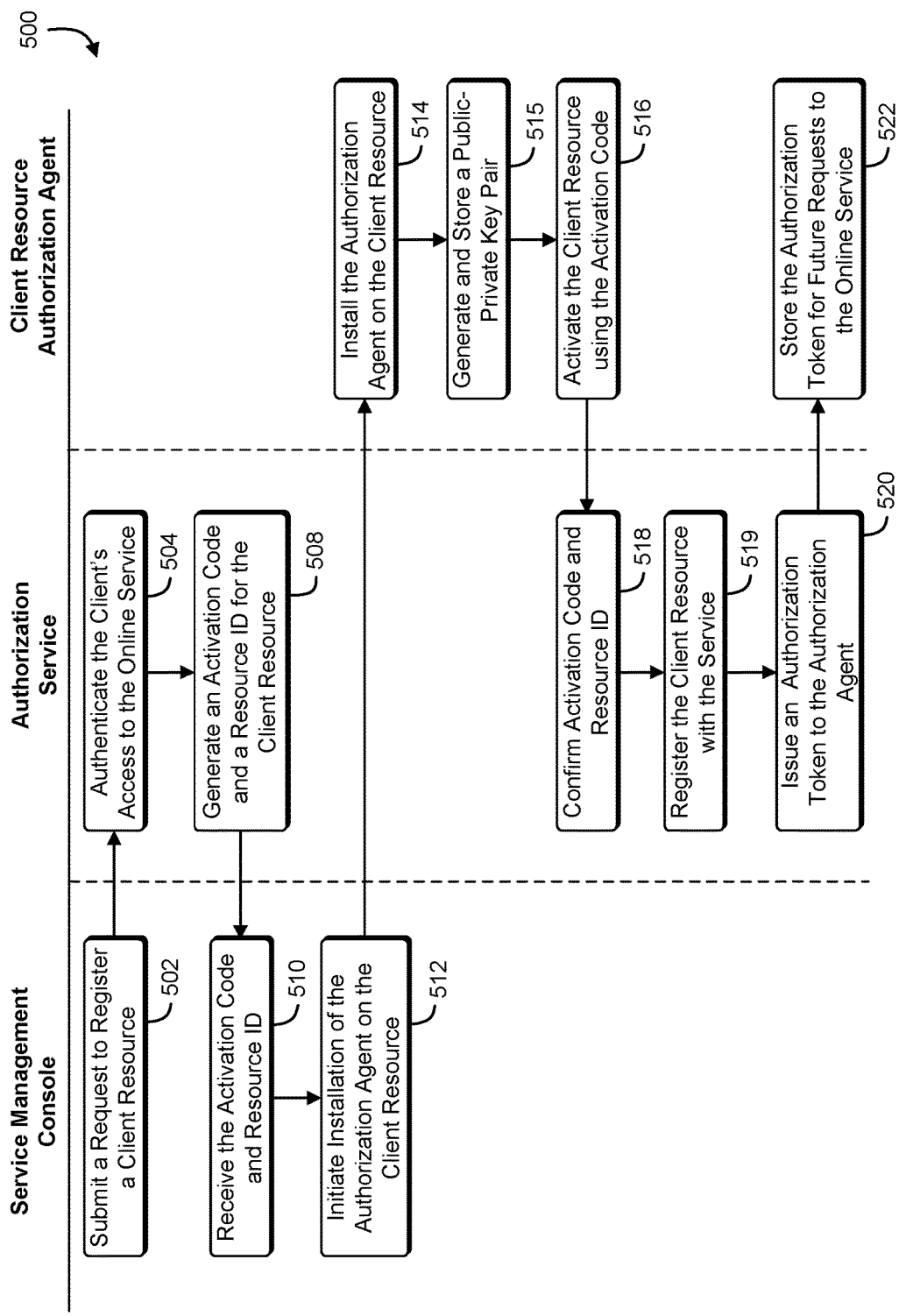
FIG. 5 shows an illustrative example of a process that, as a result of being performed by a service management console, an authorization service, and an authorization agent, authorizes access to an online service by a client resource, in accordance with an embodiment.

FIG. 5 shows an illustrative example of a process that, as a result of being performed by a service management console, an authorization service, and an authorization agent, authorizes access to an online service by a client resource, in accordance with an embodiment. A swim diagram 500 illustrates operations performed by the service management console, the authorization service, and the authorization agent. The service management console is an interface program used by a client to communicate with the authorization service. The service management console may be a command line interface, a graphical interface, or an API. The process begins at block 502, with a client submitting, via the service management console, a request to register a client resource to the authorization service. The request includes a number of parameters including a name for the client resource, and a security role and/or security permissions to be granted to the client resource. The security role and/or security permissions specify the rights that the client resource will have when accessing the online service.

At block 504, the authorization service receives the request from the service management console. The authorization service examines the client credentials which are included with the request to determine whether to register the client resource for the requested security role and/or security permissions. For example, the client may provide a username and password, a digital certificate, or a biometric signature that identifies the client and allows the authorization service to authorize the request. If the request is authorized, execution proceeds to block 508. The authorization service generates an activation code and a resource ID for the client resource, and the activation code, the resource ID, and a registration timestamp are added to the resource registration database. In some implementations, the activation code is a one-time-use alphanumeric code that expires after an amount of time or as a result of first use. The expiration may be configured by the authorization service on a per client resource basis or globally for client services authorized by the authorization service. The expiration can be recorded in the form of a timestamp representing the current time together with an offset amount of time, or as a timestamp representing a time in the future when expiration will occur. The client may specify an expiration for the activation code with a registration request. If the client specifies an expiration with the registration request the expiration is recorded in the resource registration database on the authorization service. The authorization service returns the activation code and the resource ID to the service management console.

At block 510, the service management console receives the activation code and the resource ID from the authorization service. As a result of receiving the registration information from the authorization service, the service management console initiates installation 512 of the authorization agent on the client resource. In some implementations, the authorization service provides instructions with the activation code which instruct the client to install an authorization agent on the client resource. The instructions may include an installation program or script for the authorization agent, or instructions for downloading and installation program or script for the authorization agent. The installation program or script takes, as parameters, the registration information provided by the authorization service. In another implementation, the authorization service causes the service management console to launch a script that copies an executable image of the authorization agent to the client resource, and launches the authorization agent on the client resource. In yet another implementation, the authorization service causes the service management console to launch an installation program on the client resource that installs and runs the authorization agent.

At block 514, the authorization agent is installed on the client resource. As part of the installation, the registration information provided by the authorization service to the service management console is passed to the authorization agent. The authorization agent retains the resource ID and the activation code for use in activating with the authorization service. The authorization agent generates 515 a cryptographic public-private key pair. The public-private key pair is stored by the authorization agent on the client resource, and the public key of the public-private key pair is provided to the authorization service. The authorization agent signs future requests sent to the authorization service using the private key of the public-private key pair. At block 516, the authorization agent activates with the authorization service by providing the resource ID, the public key, and the activation code to the authorization service. The activation request may be signed with the private key of the public-private key pair. In some implementations, the authorization agent generates a pseudo-unique resource ID based at least in part on a processor ID, hardware serial number, network address, IP address, or media access code ("MAC") of a network interface associated with the client resource. The pseudo-unique resource ID is provided to the authorization service during activation and may be used to differentiate between resources that are cloned or replicated during an imaging or snapshot process.

At block 518, the authorization service receives the activation request and confirms the signature on the request using the public key provided with the request. The authorization service confirms the activation code and resource ID using information in the resource registration database. Activation of the client resource is granted if the activation token is not expired, has not been previously used, and is registered to the provided resource ID. If activation is granted, the authorization service registers 519 the client resource with the online service by acquiring an authorization token from an authorization token service associated with the online service. The authorization token grants the security roles and/or security permissions for which the client resource is registered when provided with a service request to the online service. At block 520, the authorization token is provided to the authorization agent. The authorization agent receives the authorization token from the authorization service, and stores 522 the authorization token for use with service requests submitted to the online service.

In some implementations, at block 516, the authorization agent generates a public-private key pair. The public-private key pair is retained by the authorization agent for use in signing messages exchanged between the authorization agent on the authorization service. The public key of the public-private key pair is provided to the authorization service with the activation code and resource ID, in a message signed with the private key of the public-private key pair. At block 518, the authorization service confirms the signature using the provided public key and retains the public key in a resource authorization database maintained by the authorization service. Messages sent by the authorization service to the authorization agent may be signed with the public key. For example, when the authorization service sends the authorization token to the authorization agent at block 520, the authorization token may be encrypted using the public key, and the authorization agent may decrypt the message using the private key of the public-private key pair.

Figure 6:
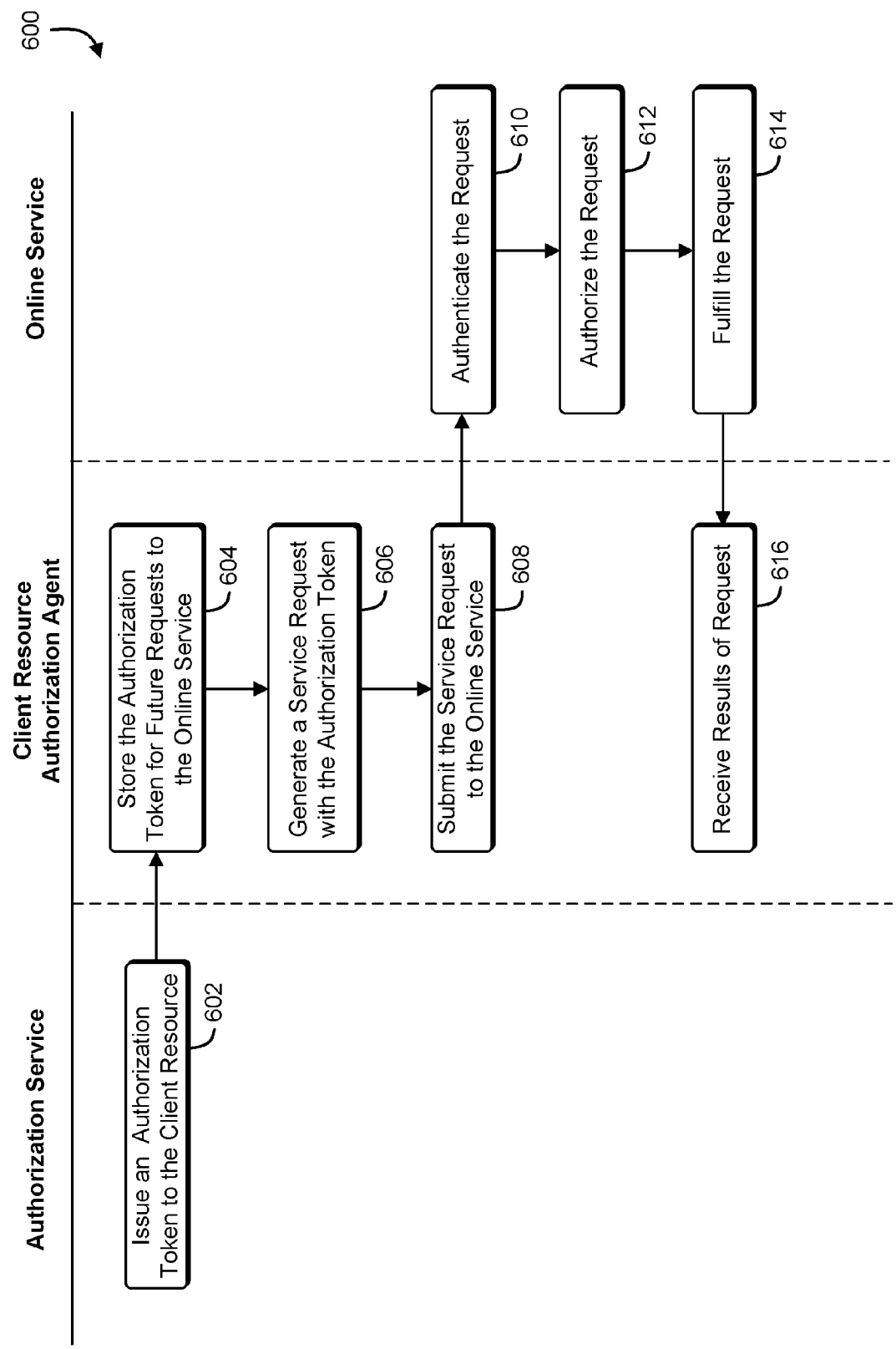
FIG. 6 shows an illustrative example of a process that, as a result of being performed by an authorization service, an authorization agent, and an online service, fulfills online service requests submitted by a client resource, in accordance with an embodiment.

FIG. 6 shows an illustrative example of a process that, as a result of being performed by an authorization service, an authorization agent, and an online service, fulfills online service requests submitted by a client resource, in accordance with an embodiment. A swim diagram 700 illustrates operations performed by the authorization service, the authorization agent, and the online service. The authorization service, as a result of the process illustrated in FIG. 5, issues 602 and authorization token to the authorization agent running on the client resource. The authorization agent stores 604 the authorization token for use with service requests submitted to the online service. At block 606, the authorization agent generates a service request for the online service. The service request is submitted 608 to the online service along with the authorization token.

As a result of receiving the service request, the online service authenticates 610 the requester by at least in part determining that the token is valid and not expired. If the resource ID is provided by the authorization agent, the authorization agent determines that the authorization token is associated with the resource ID. At block 612, the online service retrieves the security role and/or security permissions associated with the authorization token. If the security role and/or security permissions are sufficient to fulfill the request, execution proceeds to block 614 and the online service fulfills the request submitted by the client resource. If the authorization token is not valid, or if the security role or security permissions are insufficient, the service request is denied.

At block 616, the authorization agent receives the results of the service request. If the service request was fulfilled, the results may be passed to the originator of the service request such as an application program running on the client resource. If the service request was denied, the authorization agent may take further actions such as requesting renewal of the authorization token or reregistering the client resource with the authorization service.

Figure 7:
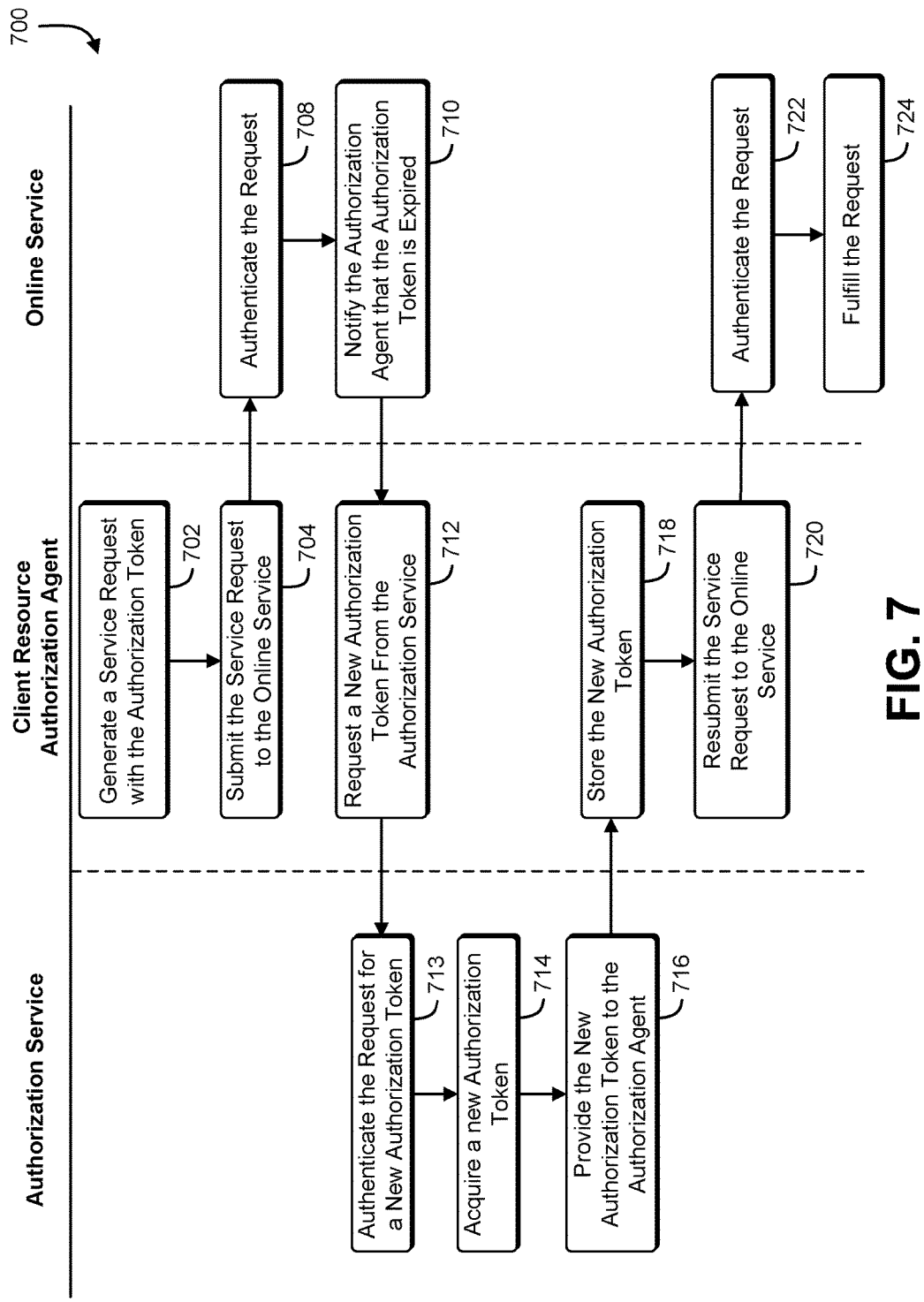
FIG. 7 shows an illustrative example of a process that, as a result of being performed by an authorization service, an authorization agent, and an online service, refreshes an authorization token used by a client resource, in accordance with an embodiment.

FIG. 7 shows an illustrative example of a process that, as a result of being performed by an authorization service, an authorization agent, and an online service, refreshes an authorization token used by a client resource, in accordance with an embodiment. In many implementations, authorization tokens that are issued to authorization agents expire after a period of time and are refreshed by the authorization agent in order to secure further access to the online service. A swim diagram 700 illustrates operations performed by the authorization service, the authorization agent, and the online service. At block 702, the authorization agent generates a service request for the online service. The service request may originate with the authorization agent, or may be generated in response to a request from an application program running on the client resource. The authorization agent submits 704 the service request to the online service, along with the authorization token.

The online service attempts to authenticate 708 the service request by confirming that the token is validly registered to the client resource, and that any credentials or signatures associated with the service request are valid. At block 710, the online service determines that the authorization token has expired, and notifies the authorization agent.

The authorization agent receives the notification that the authorization token is expired, and requests 712 a new authorization token from the authorization service. The authorization agent signs the request with a private key of a public-private key pair generated by the authorization agent, and used during the registration of the client resource with the authorization service.

As a result of receiving the request for a new authorization token, the authorization service authenticates 713 the request by validating the signature on the request using the public key of the public-private key pair maintained in the resource authorization database, and acquires 714 a new authorization token. The new authorization token may be acquired by retrieving the security roles and/or security permissions from the resource registration database and requesting an authorization token from an authorization token service associated with the online service used by the client resource. At block 716, the authorization service provides the new authorization token to the authorization agent. The new authorization token may be signed or encrypted using the public key of the public-private key pair, and decrypted by the authorization agent upon receipt.

The authorization agent receives the new authorization token from the authorization service, and stores 718 the new authorization token for use in submitting service requests to the online service. The service request is resubmitted 720 the online service by the authorization agent along with the new authorization token. Service requests may be submitted to the online service using a secure network protocol such as TLS or SSL on an IP port designated for receiving such requests.

The online service receives the resubmitted service request and authenticates 722 the resubmitted request using the new authorization token. If the new authorization token is associated with a security role and/or security permissions that allow the request to be fulfilled, the online service fulfills 724 the service request and returns corresponding results to the authorization agent.

In some implementations, the authorization agent generates a pseudo-unique resource ID that is provided to the authorization service when requesting a new authorization token. The pseudo-unique resource ID may be used by the authorization service to detect whether the authorization agent is installed on a client resource that is cloned from another client resource which was previously registered with the authorization service. If a cloned client resource is detected, the authorization service may register the cloned client resource is a new client resource rather than refreshing the token currently used by the cloned client resource. In some implementations, when a cloned client resource is detected, the authorization service denies the request for a new authorization token, causing the authorization agent on the cloned client resource to issue a request to register as a new client resource.

In another implementation, at block 702, the authorization agent generates a service requests sequence number for the service request. The service requests sequence number is incremented for each successive request submitted to the online service. At block 708, when the online service receives a service request containing a sequence number, the online service compares the received sequence number to the previously received sequence number. If the received sequence number is not greater than the previously received sequence number, the online service determines that the requester is a cloned client resource, and denies the service request. If the authorization agent receives notification from the online service of incorrect sequence number, the authorization agent may take several actions including sending a request to the authorization service to invalidate the current authorization token, requesting a new authorization token from the authorization service, and reporting the cloned resource to the client via the service management console.

Figure 8:
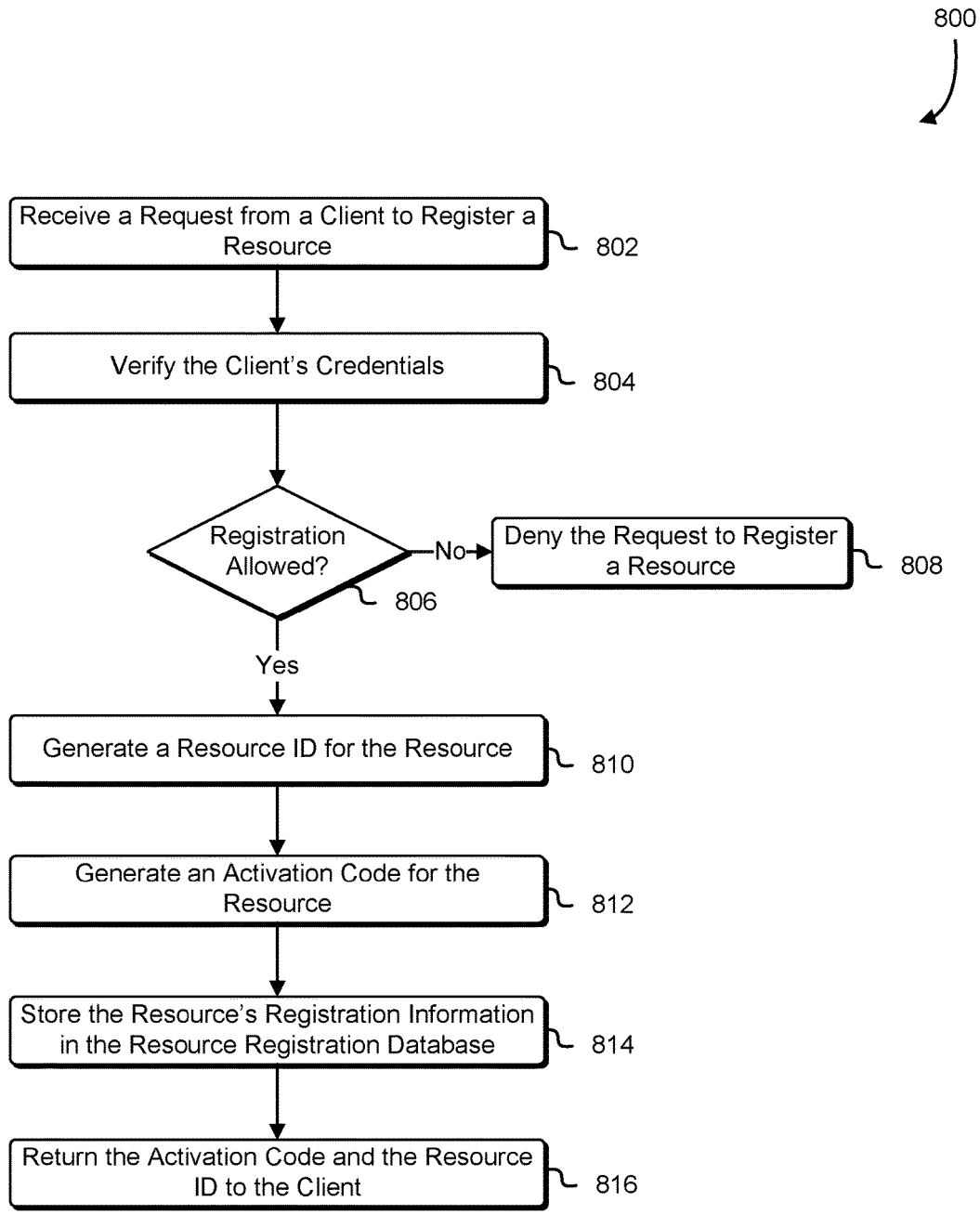
FIG. 8 shows an illustrative example of a process that, as a result of being performed by an authorization service, registers a client resource to use an online service, in accordance with an embodiment.

FIG. 8 shows an illustrative example of a process that, as a result of being performed by an authorization service, registers a client resource for use with an online service, in accordance with an embodiment. A process diagram 800 shows a process that begins at block 802 with an authorization service receiving a registration request from a client to register a client resource. The registration request may originate from a client computer that hosts a service management console. The client accesses the service management console from the client computer to grant or deny access to online services from various client resources. The registration request can include a resource name, and specifies one or more security roles and/or one or more security permissions. The security roles and permissions define rights and privileges to be granted to the client resource with respect to the online service. For example, a security role may grant the client resource administrative access rights to the online service, or privileges may be specified which grant the client resource the ability to execute a read command from a storage service but deny the ability to execute a write command to the storage service. The registration request includes a credential supplied by the client. The credentials may take the form of a username and password, digital certificate, two factor authentication sequence, biometric identification, or other credential. At block 804, the authorization service verifies the client's credentials to authenticate the client's identity. The authorization service determines 806 whether the client is authorized to register a client device with the requested security roles and/or privileges based at least in part on the client's credentials. In some implementations, the client credentials include a property (AssignRole) that indicates whether the client may assign roles and privileges to client resources. If the client's credentials do not allow the client to register a client resource with the requested security roles and/or privileges, execution advances to block 808 and the registration request is denied.

If the client's credentials permit the client to register the client resource, execution advances to block 810 and the authorization service generates a resource ID for the resource. The resource ID is an identifier that is returned to the client and supplied to the client resource when the client resource is activated. The resource ID may be an alphanumeric sequence, an integer, a generally unique identifier ("GUID"), a binary sequence, or database index. At block 812, the authorization service generates an activation code for the resource. In some implementations, the activation code is an alphanumeric sequence such as a group of four tuples, an integer, or a sequence of characters that produce a set of phonetically pronounceable syllables. For example, the activation code may be a 128 bit base 64 encoded (22 characters) activation code generated using a random or pseudorandom number. The authorization service stores 814 the resource ID and activation code along with the resource name and security roles in a resource registration database maintained by the authorization service. In some implementations, the authorization service stores the timestamp that records the time the activation code was generated, and the activation code expires after an amount of time, such as an hour.

At block 816, the authorization service returns the activation code and the resource ID to the client. In some implementations, the authorization service returns the activation code and the resource ID to the client via the service management console. The authorization service may cause the service management console to install an authorization agent on the client resource. Alternatively, the authorization service may provide instructions to the client for downloading and installing an authorization agent on the client resource.

Figure 9:
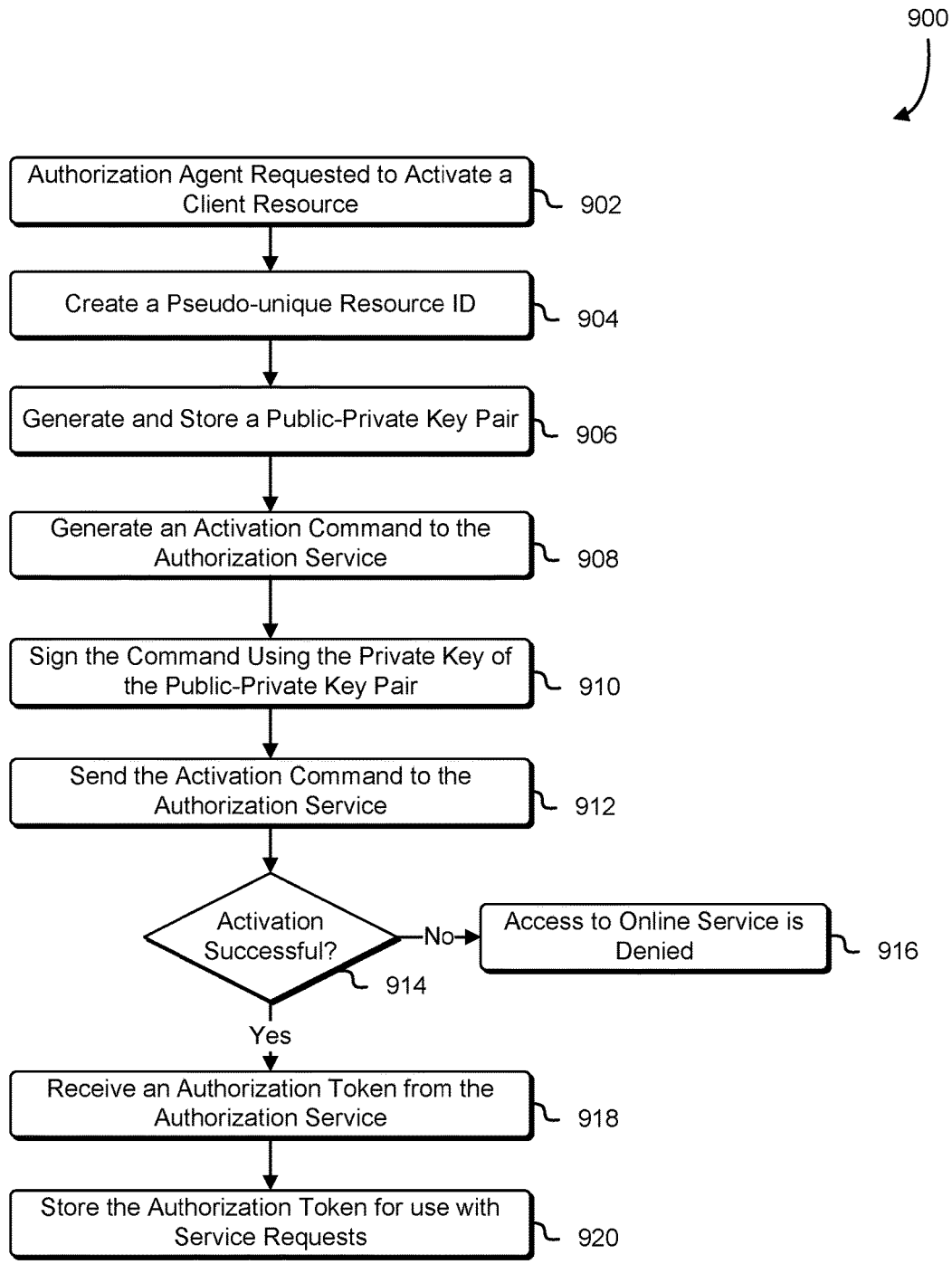
FIG. 9 shows an illustrative example of a process that, as a result of being performed by an authorization agent on a client resource, activates a client resource to use an online service, in accordance with an embodiment.

FIG. 9 shows an illustrative example of a process that, as a result of being performed by an authorization agent on a client resource, activates a client resource to use an online service, in accordance with an embodiment. A process diagram 900 illustrates a process that begins at block 902 with an authorization agent requesting to activate a client resource, for example by being commanded by a client. The authorization agent may be commanded to activate the client resource during the process by which the authorization agent is installed on the client resource. For example, the installation program or installation script that installs the authorization agent may take parameters that include an activation code and resource ID. Once the agent is installed, the installation script or installation program initiates the activation process illustrated in FIG. 9. In another example, the client installs the authorization agent, and then the client executes an activation command via an interface provided by the authorization agent, providing the activation code and resource ID as parameters.

As a result of receiving the command to activate a client resource, the authorization agent creates 904 a pseudo-unique resource ID. The pseudo-unique resource ID may be generated based at least in part on a serial number associated with the client resource, a processor ID, a network address of a network interface associated with the client resource, a media access control ("MAC") address of a network interface associated with the client resource, or system configuration of the client resource. The pseudo-unique resource ID may be used to differentiate client resources that are cloned using image files or snapshots from their parent client resources or other cloned client resources. At block 906, the authorization client generates and stores a public-private key pair such as a 2048-bit RSA key pair. The public-private key pair is used to communicate with an authorization service.

The authorization agent generates 908 an activation command to be submitted to an authorization service. The activation command may include, for example, the resource ID, the pseudo-unique resource ID, the activation code, and the public key of the public-private key pair. The activation command is signed 910 using the private key of the public-private key pair. At block 912, the activation command is transmitted to the authorization service. The activation command may be transmitted to the authorization service over the network using a secure protocol such as TLS or SSL.

The authorization service returns the results of the activation command to the authorization agent. If the authorization service indicates 914 that activation was not successful, access to the online service is denied 916. If the authorization service indicates 914 that the activation command was successful, the authorization agent receives 918 an authorization token from the authorization service that may be used to access the online service in accordance with security roles and security permissions specified by the client during registration of the client resource. The authorization token is stored 920 by the authorization agent for use with later service requests.

Figure 10:
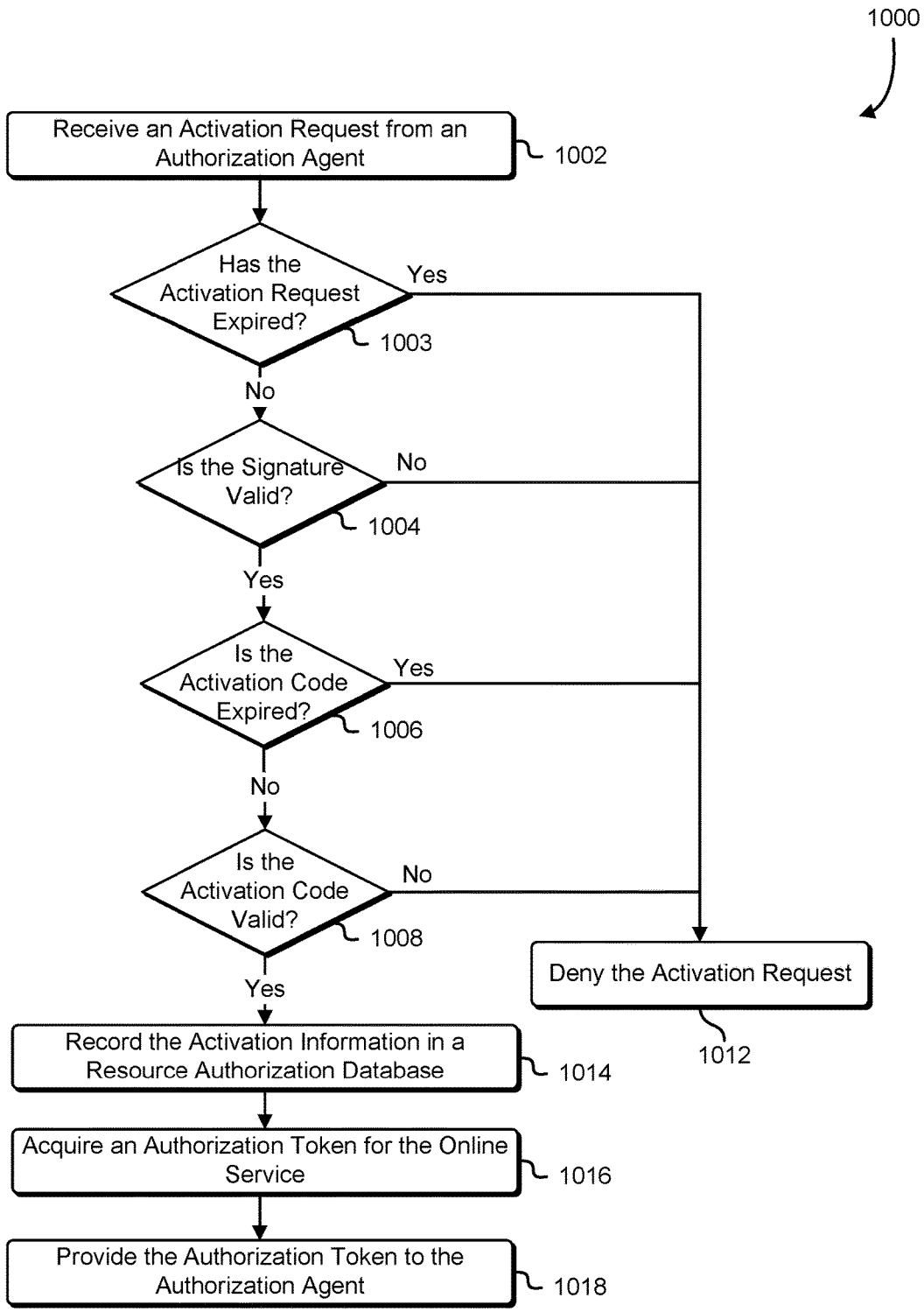
FIG. 10 shows an illustrative example of a process that, as a result of being performed by an authorization service, fulfills a resource activation request, in accordance with an embodiment.

FIG. 10 shows an illustrative example of a process that, as a result of being performed by an authorization service, fulfills a resource activation request, in accordance with an embodiment. A process diagram 1000 shows a process that begins at block 1002 with an authorization service receiving an activation request from an authorization agent running on a client resource. The activation request includes an activation code, a resource ID, a pseudo-unique resource ID, a public key of a public-private key pair associated with the authorization agent, and a timestamp. The activation request is signed with a private key of the public-private key pair. The authorization service makes a number of determinations to determine whether the activation request is allowed or not.

At block 1003 the authorization service determines whether the activation request is expired. The activation request is expired if the timestamp included with the activation code is more than five minutes old. This may prevent an activation request from being reused in a replay attack. If the activation request is not expired, execution proceeds to block 1004, and the authorization service determines whether the signature on the activation request is correct using the public key provided with the authorization request. If the signature is valid, the authorization service queries the resource registration database to determine 1006 whether the activation code has expired. The activation code may be expired if an amount of time greater than an expiration threshold has expired since the activation code was issued by the authorization service, or if the activation code was previously used to activate a client resource with the authorization service. If the activation code is not expired, the authorization service determines 1008 whether the activation code is valid. The activation code is valid if the information in the resource registration database indicates that the activation code was properly registered to the client resource hosting the authorization agent. If the above conditions are not met, execution proceeds to block 1012 and the authorization service denies the activation request. If the above conditions are met, execution proceeds to block 1014.

At block 1014, the authorization service records the activation information in a resource authorization database. The activation information may include a timestamp indicating when the activation request was granted, an expiration for an authorization token associated with the activation, the resource ID and pseudo-unique resource ID for the client resource, and the public key of the public-private key pair. At block 1016, the authorization service acquires the authorization token for the online service. An authorization token for the online service may be acquired from an authorization token service associated with the online service. In some implementations, the authorization token service is associated with an online service provider which provides a plurality of online services. In such implementations, a single authorization token may be used with the plurality of online services.

At block 1018, the authorization service provides the authorization token to the authorization agent. The authorization token may be signed or encrypted with the public key provided by the authorization agent as part of the request. The authorization token may be used by the authorization agent and the associated client resource to make service requests to the online service.

Figure 11:
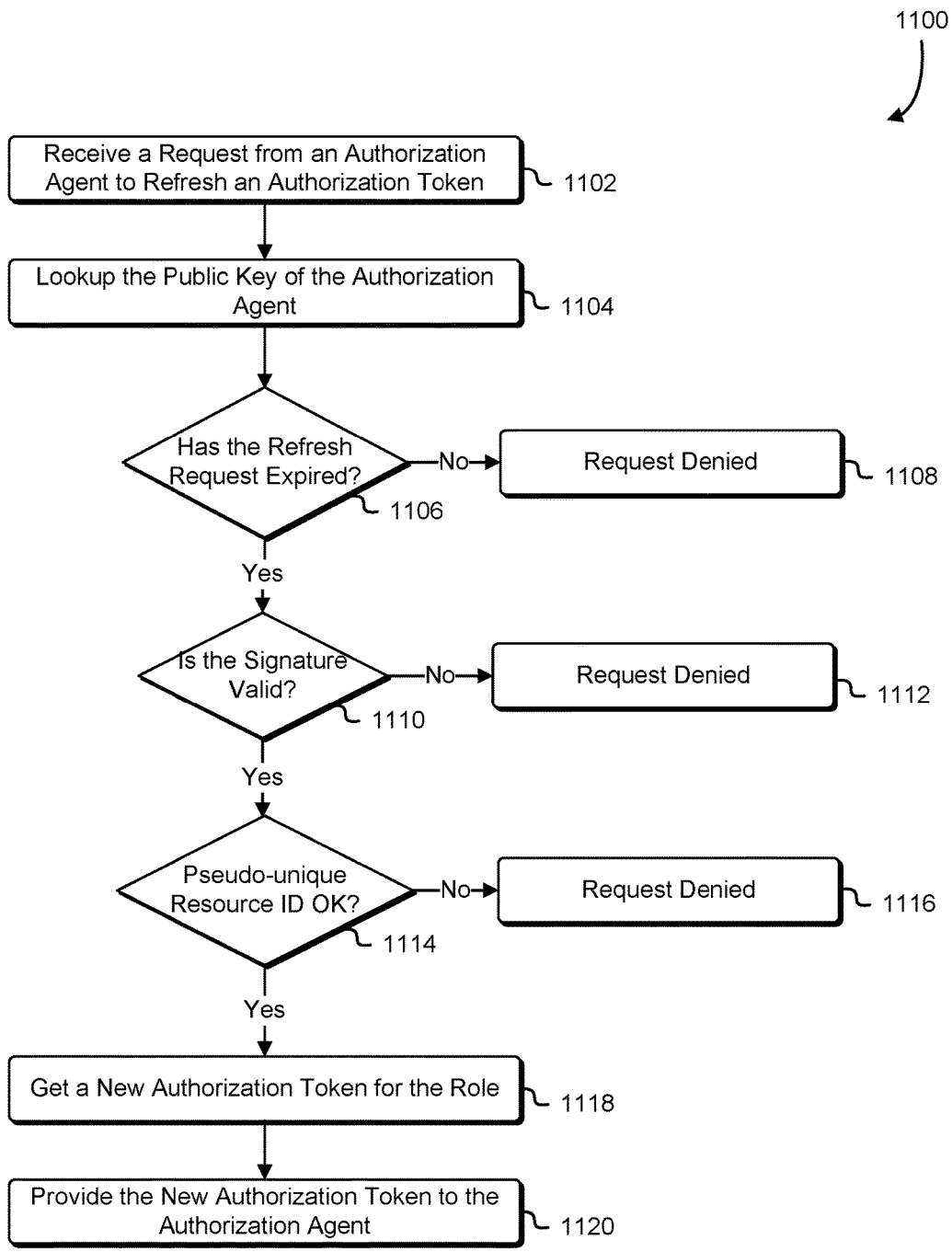
FIG. 11 shows an illustrative example of a process that, as a result of being performed by an authorization service, refreshes an activation token, in accordance with an embodiment.

FIG. 11 shows an illustrative example of a process that, as a result of being performed by an authorization service, refreshes an activation token, in accordance with an embodiment. A process diagram 1100 illustrates a process for refreshing an activation token that begins at block 1102 with an authorization service receiving a refresh request from an authorization agent. The refresh request includes a timestamp for the request, a resource ID for the client resource, and in some embodiments a pseudo-unique resource ID for the client resource. The refresh request is signed with a private key of a public-private key pair owned by the authorization agent.

The authorization service receives the refresh request and queries 1104 a resource authorization database to retrieve the public key for the authorization agent. Using the public key, the authorization service determines 1106 whether the refresh request has expired. The authorization service determines whether the refresh request is expired by determining whether the difference between the timestamp and the current time exceeds a threshold value. In some implementations the threshold value is five minutes. If the refresh request has expired, execution proceeds to block 1108 and the refresh request is denied. If the authorization service determines that the refresh request has not expired, execution proceeds to decision block 1110 where the authorization service determines whether the signature on the refresh request is valid. If the authorization service determines that the signature on the refresh request is not valid the authorization service denies 1108 the refresh request. If the authorization service determines that the signature on the refresh request is valid, execution proceeds to decision block 1114 where the authorization service queries the resource authorization database to determine if the authorization agent is hosted by a cloned client resource. A cloned resource may be detected by examining the pseudo-unique resource ID. If the resource authorization database includes an entry for the resource ID specified with the refresh request but the pseudo-unique resource ID provided with the request does not match the pseudo-unique resource ID in the resource authorization database, the authorization service determines that the client resource hosting the authorization agent may be cloned. If the authorization service determines that the client resource may be cloned, execution proceeds to block 1116 and the authorization service denies the refresh request and indicates to the authorization agent that a cloned resource has been detected. In some implementations, the authorization service creates a new entry in the resource authorization database and authorizes the cloned resource with the resource ID differentiated from the parent client resource using the pseudo-unique resource ID.

If a cloned resource is not detected by the authorization service, execution advances to block 1118 where the authorization service gets a new authorization token for the role requested for the client resource during the registration process. The new authorization token may be acquired from an authorization token service associated with an online service provider or the online service. The authorization token, and timestamps for managing expiration of the authorization token may be stored in the resource authorization database. At block 1120, the new authorization token is provided to the authorization agent. The authorization token may be signed or encrypted with the public key of the public-private key pair associated with the authorization agent.

Figure 12:
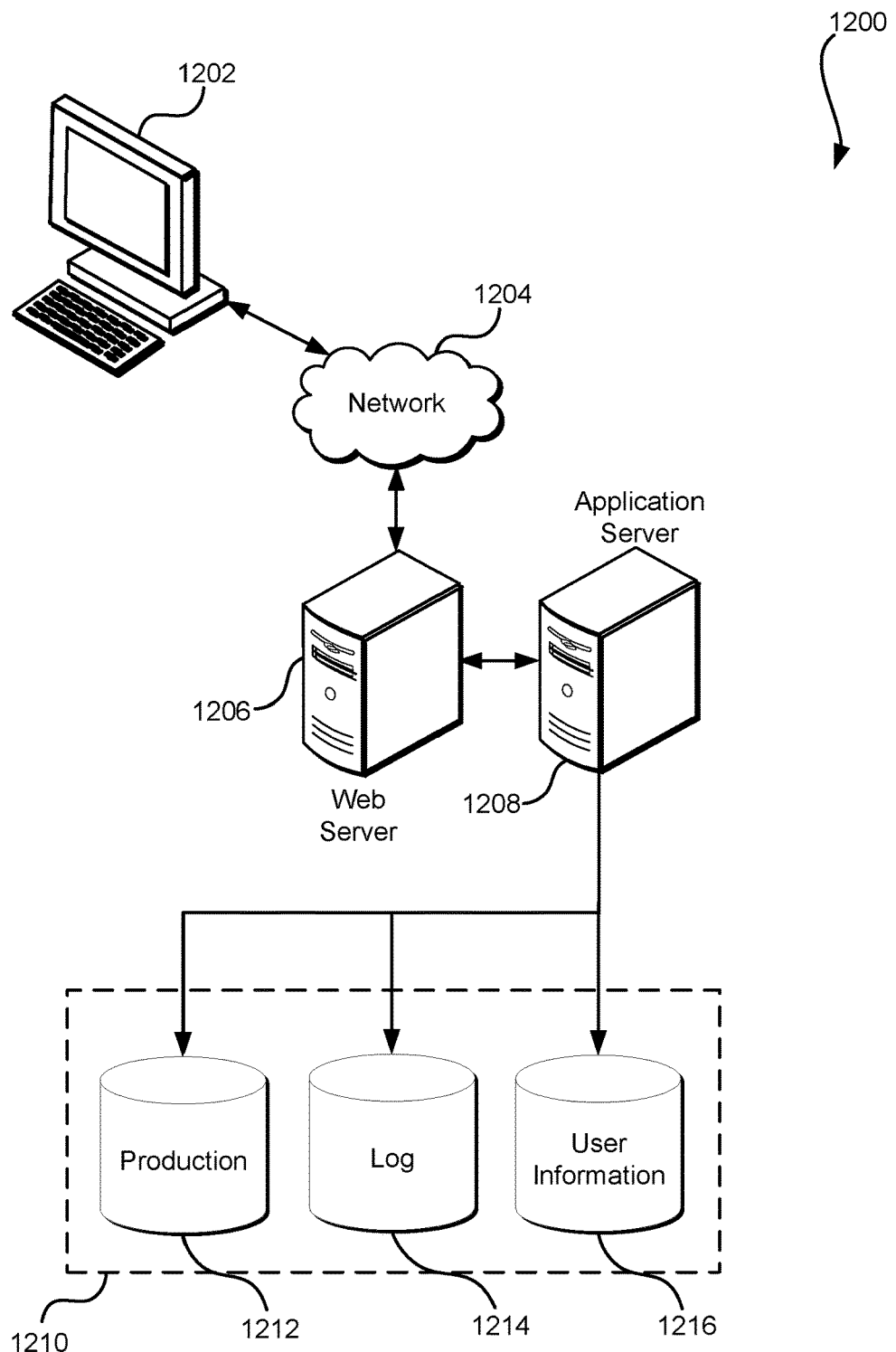
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6066, RFC 6083, RFC 6091, RFC 6176, RFC 6209, RFC 6347, RFC 6367, RFC 6460, RFC 6655, RFC 7027, and RFC 7366, which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4303, and RFC 4309), and other protocols, such as protocols for secure communication that include a handshake.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed or in the course of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   receiving, from a client, a registration request, the registration request specifying a security role to be granted to a client resource by an online service, the client resource comprising a virtual machine;
   determining that credentials submitted with the registration request are valid;
   authorizing the registration request;
   generating an activation code for the registration request;
   generating a resource ID for the client resource comprising the virtual machine;
   storing sufficient information to identify the activation code and sufficient information to identify the resource ID;
   returning the activation code to the client;
   causing an authorization agent to be installed on the client resource comprising the virtual machine;
   receiving an activation request from the authorization agent, the activation request including the resource ID, a pseudo-unique resource ID, and the activation code, the pseudo-unique resource ID generated by the authorization agent to be unique to the client resource;
   determining that the client resource is a cloned resource based at least in part on the pseudo-unique resource ID;
   acquiring, from an authorization token service that is associated with the online service, an authorization token that allows the client resource, including the virtual machine, to use the online service in accordance with the security role; and
   providing the authorization token to the authorization agent.

2. The computer-implemented method of claim 1, further comprising:
   determining that an expiration has elapsed or that the activation code has been provided with a previous activation request; and
   invalidating the activation code based at least in part on determining that the expiration has elapsed or that the activation code has been provided with a previous activation request.

3. The computer-implemented method of claim 1, wherein:
   the activation request includes a public key of a public-private key pair;
   the activation request is digitally signed using a private key associated with the public-private key pair; and
   the public key is retained.

4. A system comprising at least one computing device that implements an authorization service, wherein the authorization service:
   receives a registration request, the registration request specifying a security role to be granted to a client resource by an online service, the client resource comprising a virtual machine;
   determines that credentials submitted with the registration request are valid;
   authorizes the registration request;
   generates an activation code for the registration request;
   generates a resource ID for the client resource comprising the virtual machine;
   stores sufficient information to identify the activation code and sufficient information to identify the resource ID;
   returns the activation code to the client;
   causes an authorization agent to be installed on the client resource comprising the virtual machine;
   receives an activation request from the authorization agent, the activation request including the resource ID, a pseudo-unique resource ID, and the activation code, the pseudo-unique resource ID generated by the authorization agent to be unique to the client resource;
   determines that the client resource is a cloned resource based at least in part on the pseudo-unique resource ID;
   acquires, from an authorization token service that is associated with the online service, an authorization token that allows the client resource, including the virtual machine, to use the online service in accordance with the security role; and
   provides the authorization token to the authorization agent.

5. The system of claim 4, wherein the authorization service further:
   receives an expiration with the registration request;
   stores the expiration;
   determines that the activation code is expired by comparing the expiration to a current time; and
   invalidates the activation code.

6. The system of claim 4, wherein a service management interface installs an authorization agent on the client resource.

7. The system of claim 4, wherein the authorization service further:
   receives a pseudo-unique resource ID with the activation request, the pseudo-unique resource ID based at least in part on a processor ID of the client resource, a device serial number of the client resource, or a network address of a network interface associated with the client resource; and
determines that the client resource has not been replicated from a parent client resource based at least in part on the pseudo-unique resource ID.

8. The system of claim 4, wherein the authorization service further:
receives a public key of a public-private key pair with the activation request; and
verifies a digital signature on the activation request using the public key.

9. The system of claim 4, wherein the authorization service further:
determines that a difference between a timestamp on the activation request and a current time exceeds a timeout value; and
determines that the activation request has expired and denies the activation request.

10. The system of claim 4, wherein the online service:
receives a service request that includes a timestamp; and
denies the service request if the difference between the timestamp and the time the service request is received is greater than a threshold amount of time.

11. The system of claim 4, wherein:
the authorization token is acquired from an authorization token service that is associated with an online service provider;
the online service provider provides a plurality of online services; and
the authorization token is usable with more than one online service of the plurality of online services.

12. A non-transitory computer-readable storage medium having stored thereon executable instructions that, in the course of being executed by one or more processors of a client resource, cause the client resource to at least:
receive a registration request, the registration request specifying a security role to be granted to a client resource by an online service, the client resource comprising a virtual machine;
determining that credentials submitted with the registration request are valid;
authorizing the registration request;
generating an activation code for the registration request;
generating a resource ID for the client resource comprising the virtual machine;
storing sufficient information to identify the activation code and sufficient information to identify the resource ID;
returning the activation code to the client;
causing an authorization agent to be installed on the client resource comprising the virtual machine;
receiving an activation request from the authorization agent, the activation request including the resource ID, a pseudo-unique resource ID, and the activation code, the pseudo-unique resource ID generated by the authorization agent to be unique to the client resource;
determining that the client resource is a cloned resource based at least in part on the pseudo-unique resource ID;
acquiring, from an authorization token service that is associated with the online service, an authorization token that allows the client resource, including the virtual machine, to use the online service in accordance with the security role; and
providing the authorization token to the authorization agent.

13. The non-transitory computer-readable storage medium of claim 12, wherein the instructions further comprise instructions that, in the course of being executed by the one or more processors, cause the client resource to:
submit a service request to an online service provided by the online service provider, the service request including the authorization token.

14. The non-transitory computer-readable storage medium of claim 13, wherein the instructions further comprise instructions that, in the course of being executed by the one or more processors, cause the client resource to:
determine that the service request was denied by the online service;
submit a refresh request to the authorization service that causes the authorization service to issue a new authorization token; and
receive a new authorization token from the authorization service.

15. The non-transitory computer-readable storage medium of claim 14, wherein the instructions that cause the client resource to determine that the service request was denied further include instructions that cause the client resource to:
determine that the client resource is a cloned resource; and
register the client resource using a new resource identifier.

16. The non-transitory computer-readable storage medium of claim 14, wherein the refresh request includes a digital signature generated using a private key.

17. The non-transitory computer-readable storage medium of claim 12, wherein the instructions further comprise instructions that, in the course of being executed by the one or more processors, cause the client resource to:
receive a service request from an online service provided by the online service provider; and
fulfill the service request.

18. The non-transitory computer-readable storage medium of claim 13, wherein the service request is submitted to the online service over a computer network via a transport layer security ("TLS") connection.

19. The non-transitory computer-readable storage medium of claim 13, wherein the instructions further comprise instructions that, in the course of being executed by the one or more processors, cause the client resource to:
generate a sequence number associated with the service request;
submit the sequence number to the authorization service with the service request; and
receive an indication from the authorization service that the client resource is a cloned resource, the indication based at least in part on the sequence number.

* * * * *